United States Patent [19]

Shiotani

[11] Patent Number: 5,000,654

[45] Date of Patent: Mar. 19, 1991

[54] RECIPROCATING DRIVE APPARATUS FOR AUTOMATIC MOLDING REMOVING MACHINE

[75] Inventor: Yosuke Shiotani, Nagoya, Japan

[73] Assignee: Star Seiki Co., Ltd., Aichi, Japan

[21] Appl. No.: 458,235

[22] Filed: Dec. 28, 1989

[51] Int. Cl.⁵ .............................................. B65G 65/00
[52] U.S. Cl. ......................................... 414/751; 74/37; 74/110; 264/334; 425/444; 425/556; 901/16; 901/21
[58] Field of Search ............ 264/334; 425/139, 436 R, 425/436 RM, 444, 554, 556; 901/6, 7, 15, 18, 16, 21, 22; 74/37, 110, 89.2; 414/225, 749, 750, 751, 752, 753

[56] References Cited

U.S. PATENT DOCUMENTS

| 4,204,824 | 5/1980  | Paradis      | 425/139 |
| 4,732,554 | 3/1988  | Hellmann     | 425/556 |
| 4,781,571 | 11/1988 | Heindl et al.| 425/444 |
| 4,787,841 | 11/1988 | Simon        | 425/556 |
| 4,842,476 | 6/1989  | Shiotani     | 901/21  |

FOREIGN PATENT DOCUMENTS

| 36866   | 10/1978 | Japan | 264/334 |
| 2032018 | 2/1987  | Japan | 425/556 |

*Primary Examiner*—Timothy Heitbrink
*Attorney, Agent, or Firm*—Frishauf, Holtz, Goodman & Woodward

[57] ABSTRACT

A reciprocating drive apparatus for an automatic molding removing machine designed to remove a molded product from a molding machine by moving a chuck member, at least, in the longitudinal direction with a traveling member which is supported on a machine frame so as to be movable in the longitudinal direction. The reciprocating drive apparatus comprises a movable frame supported on the machine frame so as to movable in the longitudinal direction, the movable frame having a longitudinal dimension which is approximately half the distance of travel of the traveling member, a drive member for reciprocating the movable frame, a belt stretched between pulleys supported on two longitudinal end portions, respectively, of the movable frame, the belt having a portion thereof secured to the machine frame, and a movable member supported on the movable frame so as to be movable in the longitudinal direction, the movable member having a portion of the belt secured thereto and further having the traveling member attached thereto. Thus, when a molded product is automatically removed from the molding machine, it is possible to drive the chuck member to move horizontally through a distance which is approximately double the working stroke of the drive member and at a speed which is also approximately double the speed of the drive member.

3 Claims, 5 Drawing Sheets

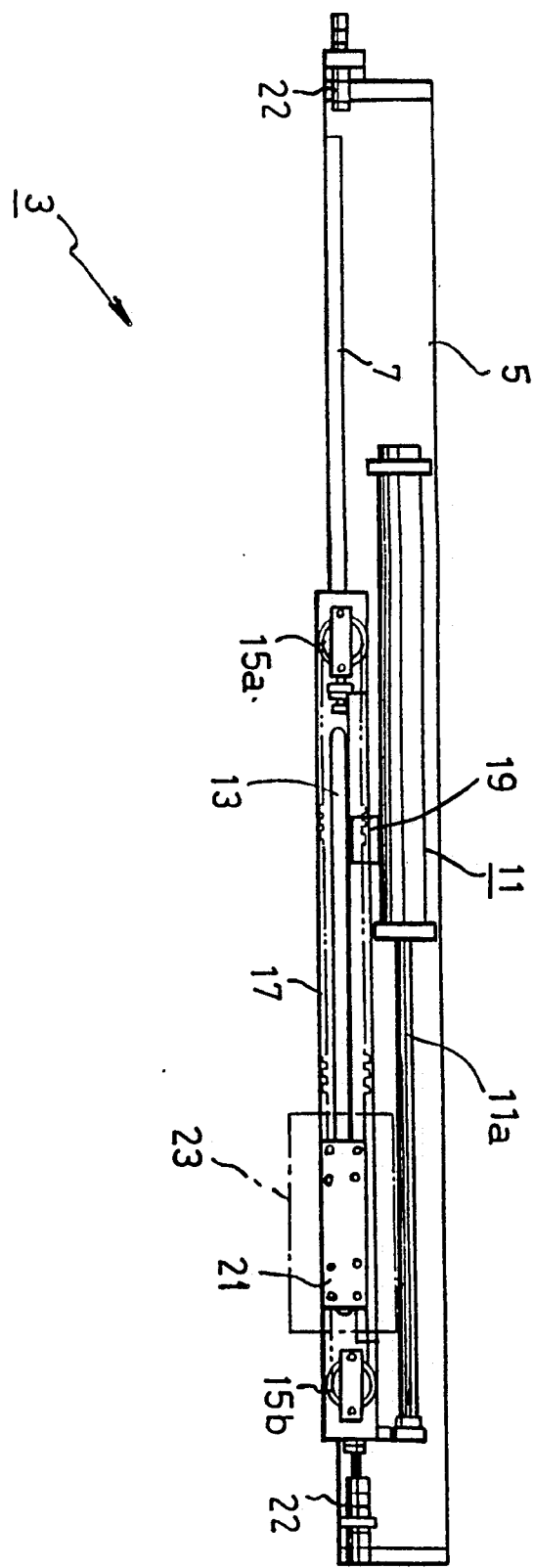

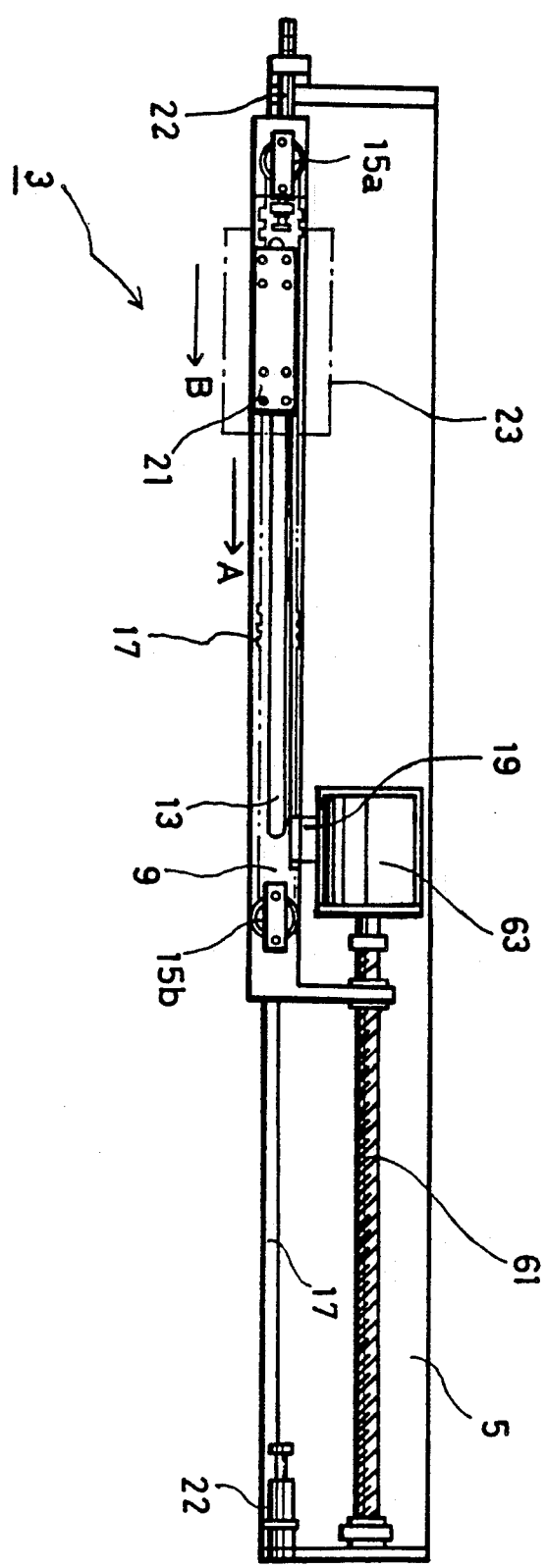

RECIPROCATING DRIVE APPARATUS FOR AUTOMATIC MOLDING REMOVING MACHINE

BACKGROUND OF THE INVENTION

The present invention relates to a reciprocating drive apparatus designed to reciprocate a traveling member of an automatic molding removing machine.

A typical automatic molding removing machine for automatically removing moldings from a molding machine has a reciprocating drive apparatus for horizontally reciprocating a chuck member that holds moldings. In one type of a generally known reciprocating drive apparatus, a pinion that is provided on the rotary shaft of an electric motor attached to a traveling member is meshed with a rack secured to a machine frame so that the traveling member is reciprocated in response to the drive of the motor.

In another conventional reciprocating drive apparatus, a rod of a cylinder that is attached to the machine frame is secured to a traveling member so that the traveling member is reciprocated in response to the operation of the cylinder.

These prior art apparatuses suffer, however, from the following problems.

In the former prior art apparatus, a high-output and high-torque electric motor is used under the necessity of moving the traveling member at high speed in order to shorten the time required to effect molding removal. In this case, since the overall weight of the traveling member having the motor attached thereto increases and consequently the inertia acting on the traveling member when traveling increases, complicated braking control must be conducted for the motor in order to stop the traveling member within a short time and with a high degree of accuracy and a shock absorber is needed, which results in a rise in the overall cost of the apparatus.

In the latter prior art apparatus, a cylinder having an axial length corresponding to the travel of the traveling member is needed, which results in an increase in the overall size of the molding removing machine. In particular, when the travel of the traveling member is long, a large-sized cylinder is needed, which results in a rise in the overall cost of the apparatus.

OBJECTS OF THE INVENTION

The present invention aims at solving the above-described problems of the prior art, and it is a primary object of the invention to provide a reciprocating drive apparatus for an automatic molding removing machine which is designed so that it is possible with a short-stroke drive member to move a traveling member through a distance which is approximately double the working stroke of the drive member and at a speed which is also approximately double the speed of the drive member and hence possible to reduce the overall size, weight and cost of the apparatus.

SUMMARY OF THE INVENTION

To this end, the present invention provides a reciprocating drive apparatus for an automatic molding removing machine designed to remove a molded product from a molding machine by moving a chuck member, at least, in the longitudinal direction with a traveling member which is supported on a machine frame so as to be movable in the longitudinal direction, the reciprocating drive apparatus comprising: a movable frame supported on the machine frame so as to be movable in the longitudinal direction, the movable frame having a longitudinal dimension which is approximately half the distance of travel of the traveling member; a drive member for reciprocating the movable frame; a belt stretched between pulleys supported on two longitudinal end portions, respectively, of the movable frame, the belt having a portion thereof secured to the machine frame; and a movable member supported on the movable frame so as to be movable in the longitudinal direction, the movable member having a portion of the belt secured thereto and further having the traveling member attached thereto.

BRIEF DESCRIPTION OF THE DRAWINGS

The accompanying drawings show in combination one embodiment of the present invention, in which like reference numerals denote like elements, and of which:

FIG. 4 is a schematic plan view of the automatic molding removing machine shown in FIG. 1, which shows the way in which the movable frame is moved; and FIG. 5 is a schematic plan view of a modification of the present invention.

DETAILED DESCRIPTION OF THE PREFERRED EMBODIMENTS

One embodiment of the present invention will be described below with reference to the accompanying drawings.

Figure 1:
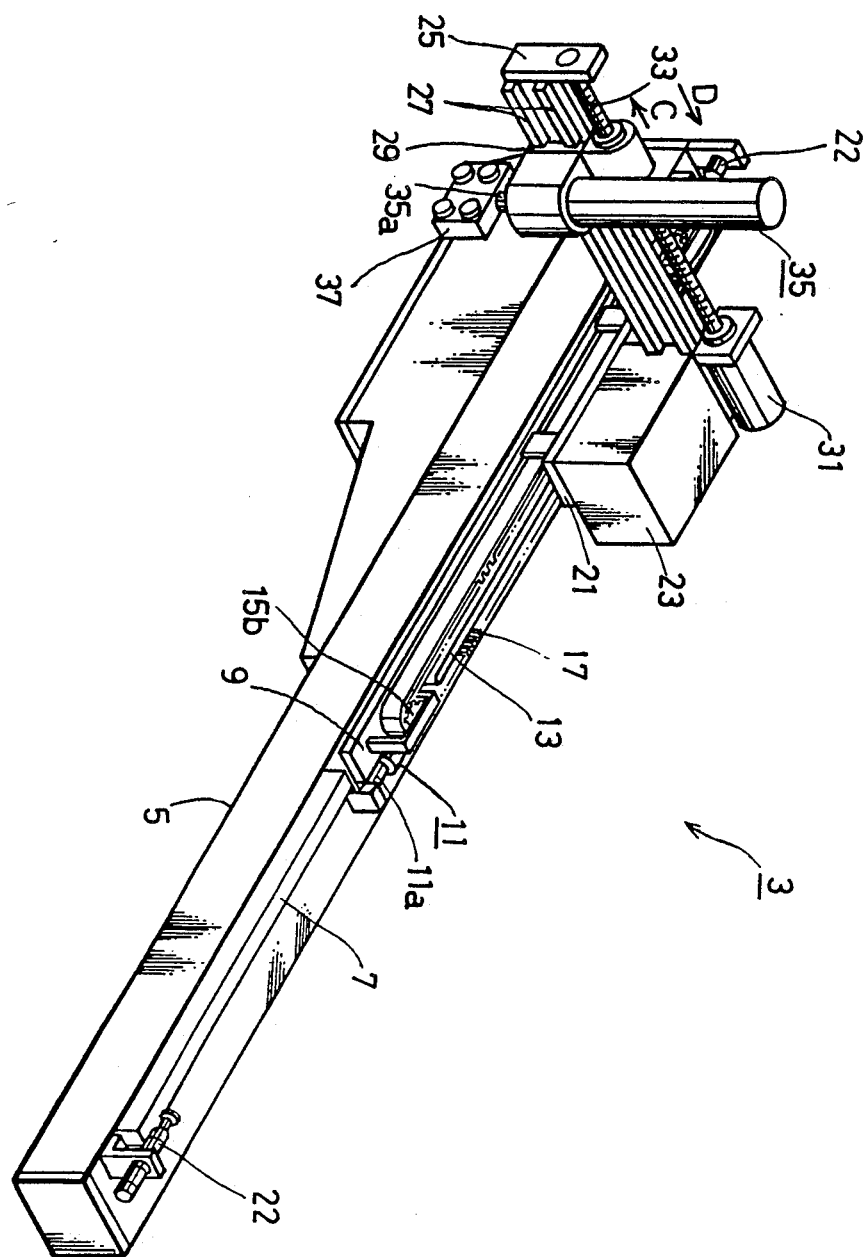
FIG. 1 is a schematic perspective view of an automatic molding removing machine.
Figure 2:
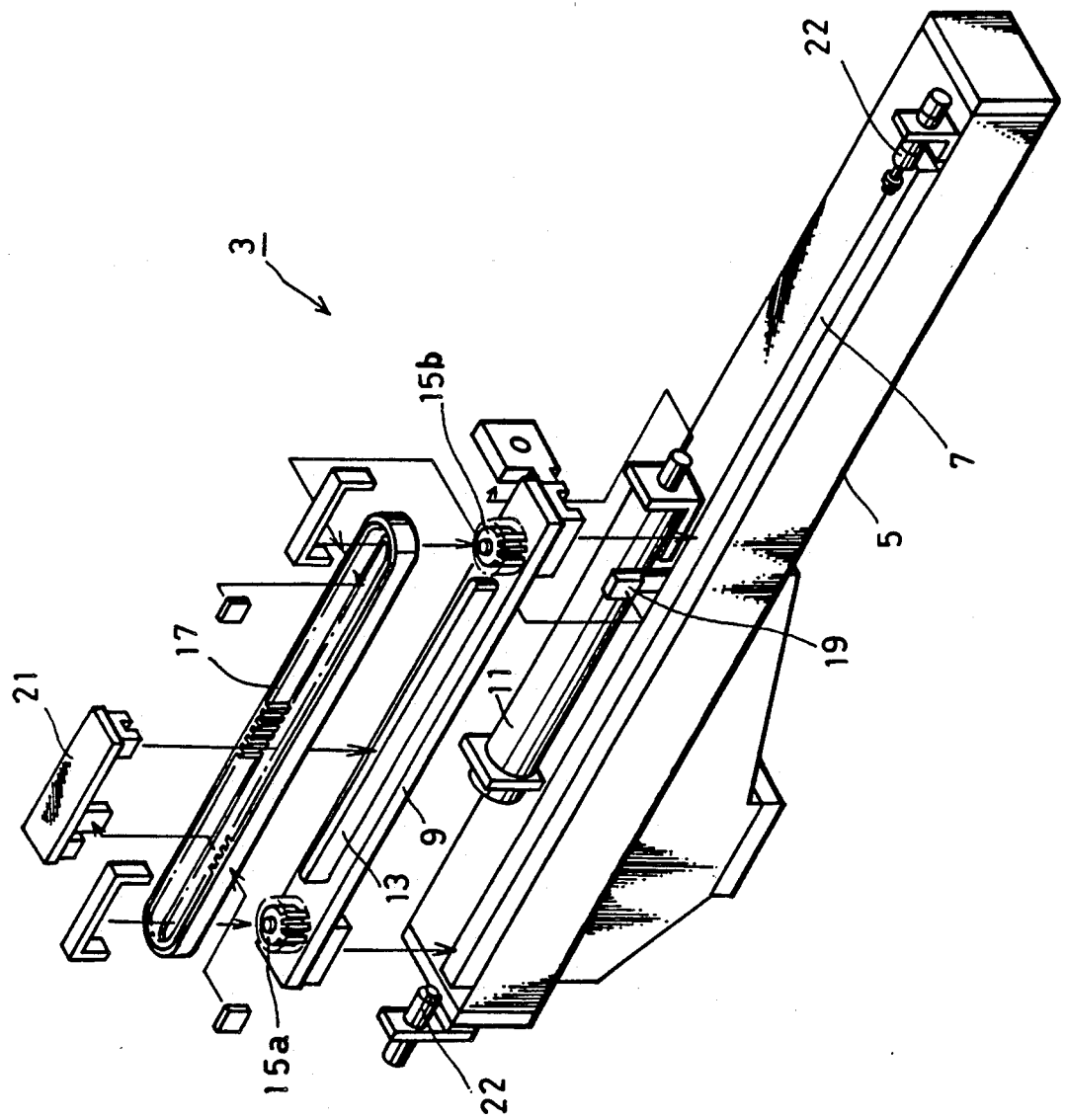
FIG. 2 is a schematic front view of the automatic molding removing machine shown in FIG. 1.
Figure 3:
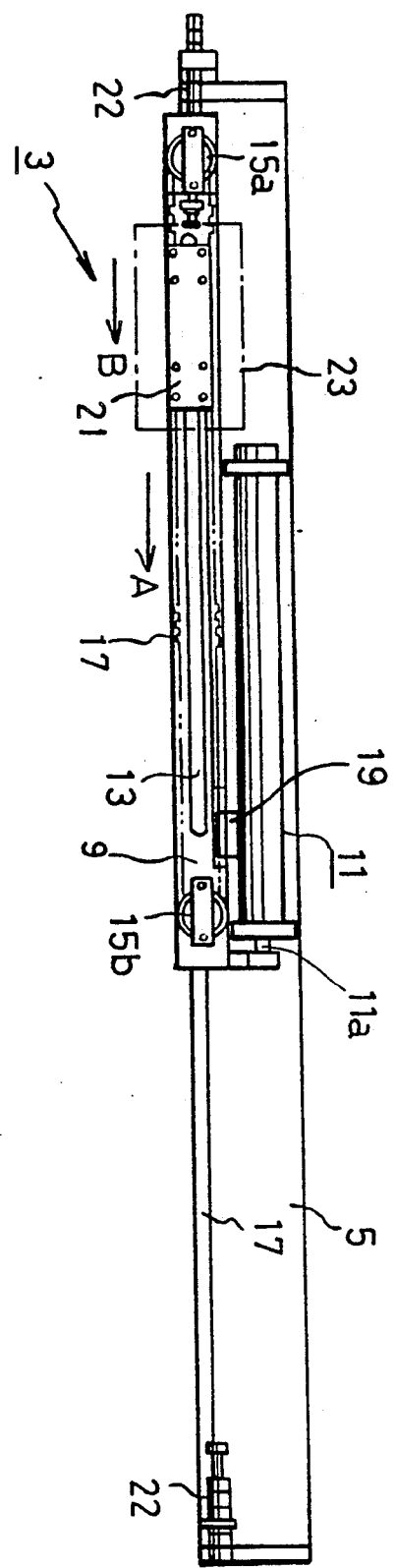
FIG. 3 is a schematic plan view of the automatic molding removing machine shown in FIG. 1.

Referring to FIGS. 1 to 3, an automatic molding removing machine 3 has a machine frame 5 which is attached to a molding machine (not shown). The machine frame 5 extends horizontally as viewed in FIG. 1 and has a guide rail 7 rigidly secured to the upper side thereof so as extend in a longitudinal direction of the machine frame 5. A movable frame 9 is supported on the guide rail 7 so as to be movable in the longitudinal direction. The movable frame 9 has a longitudinal dimension which is approximately half that of the machine frame 5. The movable frame 9 is moved between two longitudinal ends of the automatic molding removing machine 3.

To the right-hand end of the movable frame 9 (as viewed in FIG. 1) is secured a rod 11a of a cylinder 11 that is mounted on the machine frame 5 to serve as a drive member. The cylinder 11 has a working stroke which is approximately half the longitudinal dimension of the machine frame 5. In response to the operation of the cylinder 11, the movable frame 9 is moved to reciprocate between the two longitudinal ends of the machine frame 5. A guide rail 13 is attached to the movable frame 9 so as to extend in the longitudinal direction, and a pair of pulleys 15a and 15b are rotatably supported on the movable frame 9 at respective positions corresponding to the two longitudinal ends of the guide rail 13. A belt 17 is stretched between the pulleys 15a and 15b. A portion of the belt 17 is secured to a securing plate 19 which is provided on an approximately central portion of the machine frame 5 in the longitudinal direction thereof. A movable member 21 is supported on the guide rail 13 so as to be movable in the longitudinal direction. Another portion of the belt 17 is secured to the movable member 21. It should be noted that shock-absorbing members 22 are attached to two longitudinal ends, respectively, of the machine frame 5 so as to abut against the corresponding ends of the movable frame 9.

A traveling member 23 is attached to the movable member 21, and a cross frame 25 is attached to the traveling member 23 so as to extend in a direction perpendicular to the longitudinal direction of the machine frame 5 (the direction in which the cross frame 25 extends being hereinafter referred to as "the cross direction"). A pair of upper and lower guide rails 27 are attached to the cross frame 25 so as to extend in the cross direction. A cross traveling member 29 is supported on the guide rails 27 so as to be movable in the cross direction. The cross traveling member 29 is in thread engagement with a feed screw 33 which is coupled to the rotary shaft of an electric motor 31 attached to the traveling member 23 so that the cross traveling member 29 is moved in the cross direction in response to the drive of the motor 31. A vertical cylinder 35 is attached to the cross traveling member 29 in such a manner that its longitudinal axis extends vertically. A chuck member 37 is attached to a rod 35a of the vertical cylinder 35. The chuck member 37 holds an injection-molded product to move it from a specific removal position to a specific release position.

The operation of the automatic molding removing machine 3, arranged as described above, will next be explained with reference to FIGS. 1, 3 and 4.

The way in which the movable frame 9 is reciprocated will first be explained. Referring to FIGS. 1, 3 and 4, if the cylinder 11 is activated when the movable frame 9 is at the left end (as viewed in these figures) of the machine frame 5 as shown in FIG. 3, the movable frame 9 is moved on the guide rail 7 toward the right-hand side as viewed in the figures. Since a portion of the belt 17 that is stretched between the pulleys 15a and 15b attached to the two longitudinal end portions of the movable frame 9 is secured to an approximately central portion of the machine frame 5, the belt 17 travels in the direction of the solid-line arrow A shown in FIG. 3 in response to the movement of the movable frame 9. Further, since another portion of the belt 17 is secured to the movable member 21 supported on the guide rail 13 provided on the movable frame 9, as the belt 17 travels, the movable member 21 is moved in the direction of the illustrated solid-line arrow B through a distance which is approximately double the distance of travel of the movable frame 9 and at a speed which is also approximately double the speed of travel of the movable frame 9.

By the operation described above, the traveling member 23 that is attached to the movable member 21 is moved to reciprocate between the removal and release positions which are located at the two longitudinal ends, respectively, of the machine frame 5, as shown in FIG. 4.

The operation of removing a molded product from the mold will next be explained. When the movable frame 9 is moved to the removal position at the left-hand end of the machine frame 5 (as viewed in FIG. 3) by the above-described function of the reciprocating drive apparatus, the chuck member 37 is lowered into the area between a pair of molds opened by the action of the vertical cylinder 35 operated. Next, the cross traveling member 29 is moved in the direction of the solid-line arrow C shown in FIG. 1 by the action of the feed screw 33 rotated by the electric motor 31 that is driven in this state, so that the chuck member 37 is brought into contact with a molded product retained in the pair of molds so as to hold it. Next, the motor 31 is reversed to move the cross traveling member 29 in the direction of the solid-line arrow D shown in FIG. 1, so that the molded product held by the chuck member 37 is extracted from the mold.

After the above-described operation, the vertical cylinder 35 is moved upward, so that the molded product held by the chuck member 37 is taken out of the mold. Thereafter, the cylinder 11 is activated to effect the above-described reciprocating movement of the traveling member 23. That is, the traveling member 23 is moved to the release position through a distance which is approximately double the working stoke of the cylinder 11 and at a speed which is also approximately double the speed of the cylinder 11. At the release position, the molded product is released from the chuck member 37, thus completing the removal operation. It should be noted that, when the chuck member 37 is moved to the release position, the molded product may be released from the chuck member 37 after the chuck member 37 has been moved to a desired position by properly driving the vertical cylinder 35 and the motor 31, if such an operation is needed due to the positional relationship between the release position and the chuck member 37 thereat.

Thus, it is possible with this embodiment to drive the chuck member 37 to move horizontally through a distance which is approximately double the working stroke of the cylinder 11 and at a speed which is also approximately double the speed of the cylinder 11 when a molded product is automatically removed from the mold. Accordingly, it is possible to move the chuck member 37 at high speed and through a relatively long distance by use of the cylinder 11 which has a relatively short axial length and hence a relatively low cost.

Although in the foregoing description the cylinder 11 is used as a drive member to move the movable frame 9, other types of drive member may be employed in place of the cylinder 11. FIG. 5 shows a modification of the present invention, in which a feed screw 61 is rotatably supported between the right end portion and central portion of the automatic molding removing machine 3 and coupled to a motor 63 attached to the automatic molding removing machine 3 and the right end portion of the movable frame 9 is meshed with the feed screw 61 so that the movable frame 9 is moved on the automatic molding removing machine 3 in response to the rotation of the feed screw 61 driven by the motor 63.

Although the present invention has been described through specific terms, it should be noted here that the described embodiment is not necessarily exclusive and that various changes and modifications may be imparted thereto without departing from the scope of the invention which is limited solely by the appended claims.

What we claim is:

1. An automatic molding removing machine comprising:
    a machine frame having opposed end portions and a longitudinal dimension;
    a travelling member supported on the machine frame, said travelling member being movable in a longitudinal direction of said machine frame;

reciprocating drive means for moving said travelling member relative to said machine frame over a first distance of travel;

a transverse cross frame arranged substantially transverse to the longitudinal direction of said machine frame, said transverse cross frame being attached to said travelling member;

a cross travelling member supported on the transverse cross frame and movable along said transverse cross frame over a second distance of travel;

cross drive means for moving said cross travelling member along said transverse cross frame;

a vertically actuated drive member mounted to said cross travelling member; and chuck means for holding and moving a molded product, said chuck means being coupled to said vertically actuated drive member so as to be movable between an upper position and a lower position by actuation of said vertically actuated drive member for thereby vertically moving said molded product;

said reciprocating drive means comprising:

a movable frame supported on said machine frame, said movable frame being movable in the longitudinal direction of said machine frame between said end portions of said machine frame, said movable frame having end portions and a longitudinal dimension of approximately half the first distance of travel of said travelling member;

frame drive means for reciprocating said movable frame;

at least two pulleys rotatably supported on respective longitudinal end portions of said movable frame;

a belt stretched between said at least two pulleys, said belt having a portion thereof secured to said machine frame; and a movable member supported on said movable frame, said movable member being movable in a longitudinal direction of said travelling member, said movable member having a portion secured to said belt and said movable member being attached to said travelling member.

2. The automatic molding removing machine of claim 1, wherein said frame drive means comprises a cylinder having a working stroke which is approximately half the longitudinal dimension of the machine frame.

3. The automatic molding removing machine of claim 1, wherein said frame drive means comprises:

a motor coupled to said machine frame; and a feed screw coupled to said motor, said screw being rotatably meshed with said movable frame.

* * * * *